United States Patent
Fryxell et al.

(10) Patent No.: US 6,733,835 B2
(45) Date of Patent: May 11, 2004

(54) SELF-ASSEMBLED MONOLAYER AND METHOD OF MAKING

(75) Inventors: Glen E. Fryxell, Kennewick, WA (US); Thomas S. Zemanian, Richland, WA (US); Jun Liu, West Richland, WA (US); Yongsoon Shin, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 10/347,040

(22) Filed: Jan. 17, 2003

(65) Prior Publication Data

US 2003/0129312 A1 Jul. 10, 2003

Related U.S. Application Data

(60) Division of application No. 09/528,345, filed on Mar. 17, 2000, now Pat. No. 6,531,224, which is a continuation-in-part of application No. 09/272,762, filed on Mar. 19, 1999, now abandoned.

(51) Int. Cl.$^7$ .................................................. B05D 3/00
(52) U.S. Cl. ...................... 427/299; 427/387; 427/393.6
(58) Field of Search ................................ 427/299, 387, 427/393.6

(56) References Cited

U.S. PATENT DOCUMENTS

| | | | |
|---|---|---|---|
| 4,539,061 A | 9/1985 | Sagiv | |
| 5,380,585 A | 1/1995 | Ogawa et al. | |
| 5,403,665 A | 4/1995 | Alley et al. | |
| 5,725,987 A | 3/1998 | Combes et al. | |
| 6,326,326 B1 | * 12/2001 | Feng et al. | ................... 502/62 |
| 2003/0083516 A1 | 5/2003 | Korth et al. | |

FOREIGN PATENT DOCUMENTS

| | | |
|---|---|---|
| JP | 05279011 | 10/1993 |
| WO | WO98/34723 | 8/1998 |

OTHER PUBLICATIONS

Combes et al, Langmuir, 15(22), pp 7870–7875, 1999.*
Shin et al, Microporous and Mesoporous Materials, 37(1–2), pp49–56, 2000.*
C. Cao et al., "*Formation of Trialkyl Silyl Monolayers on Si(100) Using Organosilanes In Carbon Dioxide*"; p. 841–842: 1999.
X. Feng et al., "*Functionalized Monolayers on Ordered Mesoporous Supports*"; pp. 923–926: 1997.
J. Liu et al.: "*Hybrid Mesoporous Materials With Functionalized Monolayers*"; p. 161–165: 1998.

* cited by examiner

Primary Examiner—Erma Cameron
(74) Attorney, Agent, or Firm—Wells St. John P.S.

(57) ABSTRACT

According to the present invention, the previously known functional material having a self-assembled monolayer on a substrate has a plurality of assembly molecules each with an assembly atom with a plurality of bonding sites (four sites when silicon is the assembly molecule) wherein a bonding fraction (or fraction) of fully bonded assembly atoms (the plurality of bonding sites bonded to an oxygen atom) has a maximum when made by liquid solution deposition, for example a maximum of 40% when silicon is the assembly molecule, and maximum surface density of assembly molecules was 5 silanes per square nanometer. Note that bonding fraction and surface population are independent parameters. The method of the present invention is an improvement to the known method for making a siloxane layer on a substrate, wherein instead of a liquid phase solution chemistry, the improvement is a supercritical phase chemistry. The present invention has the advantages of greater fraction of oxygen bonds, greater surface density of assembly molecules and reduced time for reaction of about 5 minutes to about 24 hours.

6 Claims, 3 Drawing Sheets

SELF-ASSEMBLED MONOLAYER AND METHOD OF MAKING

CROSS REFERENCE TO RELATED INVENTION

This patent resulted from a divisional application of U.S. patent application Ser. No. 09/528,345, filed Mar. 17, 2000; now U.S. Pat. No. 6,531,224 which is a Continuation-In-Part of application Ser. No. 09/272,762, filed Mar. 19, 1999 now abandoned.

This invention was made with Government support under Contract DE-AC0676RLO1830 awarded by the U.S. Department of Energy. The Government has certain rights in the invention.

FIELD OF THE INVENTION

The present invention is a self-assembled monolayer and method of making.

BACKGROUND OF THE INVENTION

Since their unveiling in 1992, mesoporous ceramics have inspired substantial interest, especially by adding self-assembling monolayer compounds to the surface(s) of the mesopores. By varying the terminal group of the self-assembling monolayer, various chemically functionalized materials have been prepared. A mesoporous material is defined as a material, usually catalytic material, having pores with a diameter or width range of 2 nanometers to 0.05 micrometers.

Exemplary of use of self-assembling monolayer(s) on a mesoporous material is the International Application Publication WO 98/34723 (E-1479 CIP PCT). The self-assembling monolayer(s) is made up of a plurality of assembly molecules each having an attaching group. For attaching to silica, the attaching group may include a silicon atom with as many as four attachment sites, for example; siloxanes, silazanes, and chlorosilanes. Alternative attaching groups include metal phosphate, hydroxamic acid, carboxylate, thiol, amine and combinations thereof for attaching to a metal oxide; thiol, amine, and combinations thereof for attaching to a metal; and chlorosilane for attaching to a polymer. A carbon chain spacer or linker extends from the attaching group and has a functional group attached to the end opposite the attaching group.

Methods of attaching and constructing the self-assembling monolayer on a mesoporous material involve solution deposition chemistry in the presence of water. More specifically, as reported by Feng, X.; Fryxell, G. E.; Wang, L. Q.; Kim, A. Y.; Liu, J.; Kemner, K. *Science*, 1997, 276, 923–926 (Feng et al, 1997); and Liu, J.; Feng, X.; Fryxell, G. E.; Wang, L. Q.; Kim, A. Y.; Gong, M. *Adv. Mat.* 1998, 10, 161–165 (Liu et al., 1998), a synthetic protocol to prepare monolayers of MPTMS (mercaptopropyl trimethoxysilane) within the pores of MCM-41 involved a 1-hour hydration step, followed by a 6-hour silanation step in refluxing toluene. At this stage, the silane coverage is limited to approximately 3.6–4.0 silane molecules/$nm^2$ (this surface density is not enhanced by either extending the reaction time or increasing silane concentration). Following the silanation with a 2–3 hour azeotropic distillation drives the equilibria through the removal of reaction by-products, and increases this surface density to 5.0–5.2 silanes/$nm^2$. This surface density is representative of typical silane-based monolayers. The monolayer coated mesoporous product is then isolated by filtration, washed extensively and then dried for several days. In summary, the overall procedure takes about 10 hours of laboratory prep time and 1–10 days of drying time. The time is driven by the kinetics of getting the self-assembling molecules into the mesopores and getting the water and any other solvent out of the mesopores.

The product obtained exhibits a maximum of 40% of the monolayer silicon atoms fully crosslinked for maximizing monlayer stability. Ideally, 100% of the silicon atoms would be fully crosslinked. Full crosslinking is having three of the four bonding sites linked to another silicon atom via an oxygen atom, with the fourth linked to the functional group terminated hydrocarbon chain. However, the presence of "dangling" hydroxyl groups (OH—) cannot be avoided in the solution method and it is the presence of the "dangling" hydroxyl groups that interferes with the crosslinking of the monolayer, thus placing a practical upper limit on the number of silicon atoms that are fully crosslinked of 40%.

Thermal "curing" of silane monolayers, wherein typical thermal curing (ca. 150° C.), of a silane monolayer creates a terminal to internal silane ratio of 1:2 corresponding to about 60% to 65% of attaching molecules (silicon) fully crosslinked.

Hence, there remains a need for a mesoporous material having self-assembling monolayer thereon with a greater fraction of the assembly atoms fully crosslinked. There is also a need for greater surface density of silicon atoms, which may also be expressed as a greater surface density of monolayer coverage. Finally, there is a need for a method of making these materials that is less time consuming.

The main difficulty in functionalizing microporous materials may be attributed to diffusion of the organic molecules intoto the small pore channels. In the last few years, both post-silanization and in-situ deposition have been successfully applied to mesoporous materials, in which the pore diameter is usually larger than 2 nm. The mesoporous materials (usually synthesized using surfactant micelles as templates) have very uniform pore sizes. Because of their high surface area and the open pore channels; functionalized mesoporous materials have been investigated for many adsorption and catalysis applications. However due to the large pore size and the amorphous nature of the materials, these materials are not likely to find application as size selective catalysts.

A zeolite is any one of a family of hydrous aluminum silicate minerals, whose molecules enclose cations of sodium, potassium, calcium, strontium, or barium, or a corresponding synthetic compound, used chiefly as molecular filters and ion-exchange agents. Compared to the mesoporous materials, the diffusion of organic molecules in zeolites is severely hindered by the small pore size. Deposition of silanes on the exterior surface is therefore greatly favored over silanation of internal surfaces. Heretofore, it had been believed that introducing organic functional groups to the internal pore surfaces of commercial zeolites to produce size selective microporous catalysts could not be achieved due to the size of the pores.

SUMMARY OF THE INVENTION

According to the present invention, the previously known functional material having a self-assembled monolayer on a substrate has a plurality of assembly molecules each with an assembly atom with a plurality of bonding sites wherein a bonding fraction (or fraction) of fully bonded assembly atoms (fully crosslinked assembly atoms) with the plurality of bonding sites (the plurality of bonding sites bonded to an oxygen atom) exceeds a maximum compared to solution deposition, and maximum surface density of assembly molecules greater than for solution deposition. For example, with the assembly atom silicon, having 4 bonding sites, the bonding fraction maximum for solution deposition was 40% as deposited or about 60% to 65% (a terminal to internal silane ratio of about 1:2) after thermal curing, and maximum surface density of silane molecules was 5.2 silanes per square nanometer. Note that crosslinking fraction and surface density are separate parameters.

The method of the present invention is an improvement to the known method for making a self-assembled monolayer on a substrate, wherein instead of a liquid phase solution chemistry, the improvement is a supercritical phase chemistry.

The present invention has the advantages of greater fraction of bridging oxygen bonds, and greater surface density of assembly molecules resulting in a lower defect coating that enhances thermal and chemical stability or resistance. Further, hydrolysis and deposition is complete within 5 minutes, a surprising rate enhancement of more than two orders of magnitude. Not only are the hydrolysis and deposition considerably accelerated relative to standard solution methods, but the final drying phase has been completely eliminated by the use of a supercritical fluid as the reaction medium. The product emerges from the reaction chamber dry and ready to use. This represents considerable timesavings.

Water is a necessary reactant in the hydrolysis and condensation chemistry of alkylsilanes to form self-assembled monolayers onto ceramic oxide surfaces. It must be present in appropriate (stoichiometric) amounts; too little will result in incomplete deposition and crosslinking and too much will result in bulk solution phase polymer formation. Experience has shown that approximately $10^{13}$ water molecules per square meter of available surface area is optimum. This amounts to approximately 2 water molecules for each silane to be anchored.

It is also important that this water be intimately associated with the surface and not free in solution. By having the water in close proximity to the ceramic oxide surface, the silane hydrolysis/condensation chemistry can only take place on the surface, thereby favoring the desired monolayer deposition and avoiding solution phase polymerization (which leads to bulk amorphous polymer and blocked pores). This association is necessary to obtain any thin film morphology, and is critical to obtain clean monolayer formation.

In addition, the water associated with the ceramic oxide surface must be evenly spread out across the surface. This causes the hydrolysis chemistry to be uniformly spread out across the ceramic oxide surface, which reduces monolayer defect formation, while at the same time minimizing bulk polymerization.

By adding the water first, and allowing it to fully equilibrate with the ceramic oxide surface, Applicants are able to exploit the natural affinity that these ceramic oxides have for water and are thus able to insure that these important conditions are met.

Adding water separately to a solution of silanes will result in bulk solution phase polymerization competing with any possible monolayer deposition. This is counter-productive since it significantly depletes the amount of silane available to form the monolayer and in the case of a mesoporous substrate, the bulk amorphous polymer will plug and block the pore channels, reducing the available surface area and restricting interfacial access, thus eliminating the most desirable features of such a material.

In the liquid solution deposition of the prior art, a wastestream is produced as a mixture of water, methanol, toluene and small amounts of mercaptan that failed to be deposited. It is impractical to separate this mixture, and therefore the mixture is usually disposed of as hazardous waste. According to the present invention using a supercritical fluid for solution deposition, the only by-product of the reaction (hydrolysis) is an alcohol (e.g. methanol), which is easily separated from the supercritical fluid (which can be recovered for recycling). In fact, the alcohol is of sufficient purity to represent a potential feedstock that can be sold or recycled.

A further advantage of using a supercritical fluid as the reaction medium is the elimination of flammable solvents, and performing the reaction under completely non-flammable conditions, which can be a significant concern upon scale-up.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

According to the present invention, the previously known functional material having a self-assembled monolayer on a substrate, the self-assembled monolayer having a plurality of assembly molecules each with an assembly atom with a plurality of bonding sites wherein a portion of the assembly atoms have the plurality of bonding sites bonded to an oxygen atom is improved so that a greater portion of the assembly atoms have the plurality of bonding sites bonded to an oxygen atom.

In addition, the known functional material having a self-assembled monolayer on a substrate having a surface density by liquid solution deposition of the self-assembled molecules is improved so that the surface density is greater.

The method of the present invention is an improvement to the known method for making a self-assembled monolayer on a substrate, the self-assembled monolayer having a plurality of assembly molecules each with an assembly atom with a plurality of bonding sites, the method having the step of bonding a plurality of oxygen atoms to a fraction of the-plurality of bonding sites; wherein the improvement is the bonding done by preparing the self-assembled monolayer in a supercritical fluid.

The supercritical fluid may be polar or non-polar. Compounds useful in the supercritical phase according to the present invention included carbon dioxide, and possibly freons, nitrogen, noble gases, alkanes, alkenes, alkynes, and combinations thereof.

The thermal curing of the self-assembled monolayer may be during or after forming of the self-assembled monolayer. In other words, a self-assembled monolayer that has been prepared in a supercritical fluid exhibiting a portion of assembly atoms fully crosslinked to oxygen atoms and a maximum surface density of assembly atoms may be exposed to a supercritical fluid for a time that is effective in converting interfering hydroxyl groups to bridging oxygen bonds, thereby increasing the number of fully crosslinked silicon atoms to a greater portion. Alternatively, a self-assembled monolayer prepared by any other method, for example liquid solution chemistry, may be treated by adding assembly molecules to the gaps of the alternatively prepared monolayer. The assembly molecules are added in a supercritical fluid containing additional assembly molecules. The greater portion is at least about 75%, preferably greater than or equal to 80%.

The assembly atoms are selected to be compatible with the substrate. For attaching to silica, the assembly atom may include a silicon atom with four attachment sites, for example siloxane, silazane, and chlorosilane. Alternative assembly molecules include metal phosphate, hydroxamic acid, carboxylate, thiol, amine and combinations thereof for attaching to a metal oxide; thiol, amine, and combinations thereof for attaching to a metal; and chlorosilane for attaching to a polymer. A carbon chain spacer or linker may extend from the assembly atom and has a functional group attached to the end opposite the assembly atom.

For silicon atoms having four bonding sites, the portion of fully crosslinked bonding sites by supercritical fluid solution exposure including supercritical fluid solution deposition is greater than or equal to about 40% as deposited. Additional exposure time increases the fully crosslinked fraction to at least about 55%. Table 1 shows the amount of time for the percent of fully crosslinked siloxanes for supercritical fluid processing at 7500 psi and 150° C. The times and percent of full crosslinking are pressure and temperature dependent.

TABLE 1

Supercritical $CO_2$ Exposure Time for
Percent of Fully Crosslinked Siloxanes

| Time (hours) | % of Fully Crosslinked Siloxanes |
|---|---|
| ≤1/12 | >40 |
| 4 | 55 |
| 24 | 75 |

In addition, supercritical fluid solution deposition results in greater surface density of the assembly molecules. For siloxane, the surface density is greater than 5.2 siloxane molecules per square nanometer, and has been demonstrated up to 6.5 siloxane molecules per square nanometer.

Alternatively, or additionally, the surface deposition of the self-assembling monolayer(s) may be done in a manner of placing one or more self-assembling monolayer precursor(s), including but not limited to alkoxysilane, silazane, chlorosilane, and combinations thereof, together with mesoporous material that may be ceramic, for example metal oxide, including but not limited to silica, alumina, titania, and combinations thereof, in a vessel that is subsequently filled with a supercritical fluid, including but not limited to carbon dioxide ($CO_2$), ethane ($C_2H_6$), ammonia ($NH_3$), and combinations thereof, to obtain the self-assembling monolayer(s) on the mesoporous or zeolite material. By using a supercritical fluid for deposition of the self-assembling monolayer, the surface density of silanes may be greater than 5.2 silanes per square nanometer. The surface density is controlled by the amount of assembly molecule (e.g. silane) used for a given surface area of mesoporous material. Moreover, deposition is complete in about 5 minutes and no subsequent drying is needed. With a 5-minute deposition, the percent of fully crosslinked silion atoms is about 40%. Additional supercritical fluid exposure time increases the percentage of fully crosslinked silicon atoms (see Table 1 above).

Further, the placing of the calcined mesoporous material may include mixing a sol-gel solution and surfactant for producing a mesoporous green body; removing the surfactant with the supercritical fluid and making a dry green body; and calcining said dry green body into the claimed mesoporous material. In this manner, the entire process from sol-gel templating through self-assembling monolayer deposition to increasing the fraction of fully bonded silicon atoms may be done in a single vessel in a supercritical fluid environment.

EXAMPLE 1

An experiment was conducted to test the influence of supercritical carbon dioxide ($SCCO_2$) on the hydration of a mesoporous silica designated MCM-41, obtained by making the MCM-41 according to U.S. Pat. No. 5,264,203 (Mobil Oil Corporation, Fairfax, Va.). The calcined substrate (primarily Q4 [non-hydroxylated silanol]) was free of any silane(s).

Water was introduced to the pores of the MCM-41 sample via passive hydration in a 100% humidity chamber, followed by subjecting the hydrated sample to $SCCO_2$ forced hydrolysis at 100° C. This hydration protocol involved neutral pH, no salt, no ceramic oxide or organic contaminants; just water, carbon dioxide and heat.

NMR analysis showed that this hydrolysis treatment was found to increase the bonding fraction (hydroxylated silicon atoms) to 46% Q3 (surface silanol) and 8% Q2 (geminal silanol). This hydrolysis was carried out in the presence of excess water and hydrolysis stopped at this point, with no damage to the mesostructure. The mild conditions of this hydrolysis prevent the dissolution of the MCM-41 since silicic acid is insoluble in $SCCO_2$, and thus there was very little risk of collapsing the mesostructure. ($SCCO_2$ is very nonpolar, and approximates hexane in its solvating power).

Figure 1:
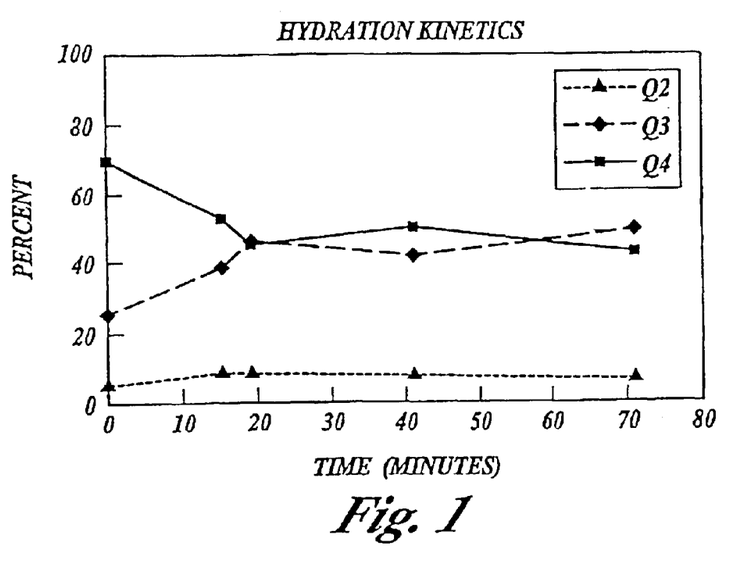
FIG. 1 is a graph of percent composition versus time for the hydroxylated silanol.

The hydrolysis reaction was complete in about 20 minutes (See FIG. 1).

A comparison was made to a hydration or hydrolysis done by placing a second sample of MCM-41 in water and boiling at atmospheric pressure for 4 hours. In this comparison, no change or difference was observed.

EXAMPLE 2

An experiment was conducted to compare the surface density of assembly molecules using prior liquid solution deposition as reported by Feng et al., 1997 and Liu et al, 1998 (described in Background above), and using the supercritical fluid solution deposition of the present invention.

Surface density was determined gravimetrically and by $^{29}Si$ NMR.

The surface density of the product made with the liquid solution deposition which included an azeotropic distillation was 5.0–5.2 silanes/nm$^2$.

According to the present invention, The silica was hydrated by simply storing it in a 100% humidity chamber and monitoring the sample's weight as a function of time, stopping at 20–25% weight gain. The MCM-41 was added to the sample holder along with the MPTMS (mercaptopropyl trimethoxysilane), then the system was sealed and brought up to pressure and temperature (7500 psi and 150° C.) with $SCCO_2$. After only 5 minutes, a monolayer with a surface density of 6.4 silanes/$nm^2$ was deposited which was surprisingly approximately 20% higher than achieved using liquid phase deposition.

Figure 2A:
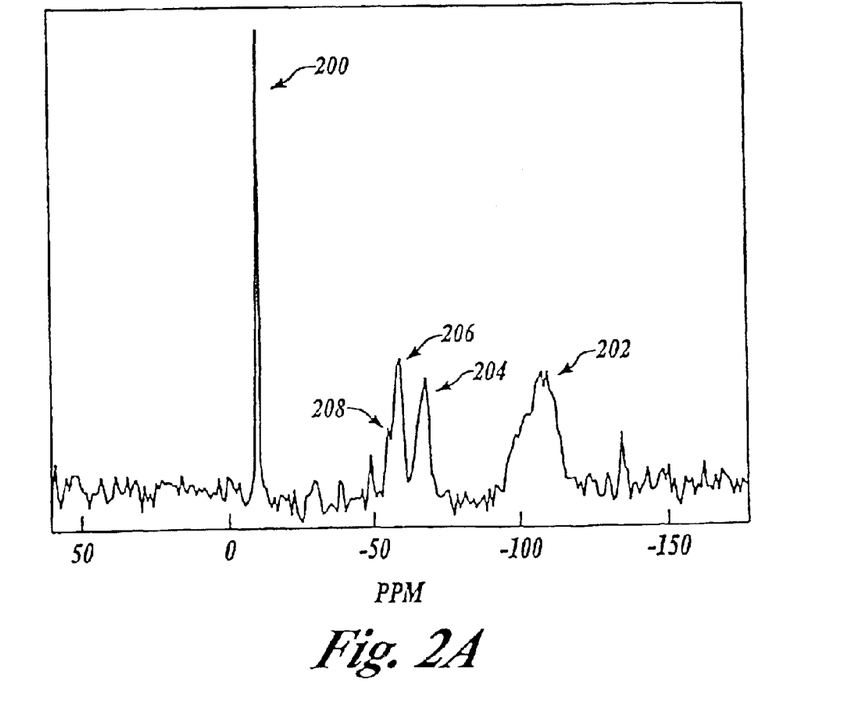
FIG. 2a is an NMR spectrum of a 5-minute sample made according to the present invention.

The spectrum of this 5-minute sample is shown in FIG. 2a. A reference peak 200 is from TTMS tetrakis (trimethylsilyl) silane. The peak 202 is a combination of signals for Q2, Q3, and Q4 silicic acid units in the base material. The peaks 204, 206, 208 are the internal, terminal, and isolated silanes respectively. The silane demographics of this sample are similar to those found in monolayers prepared under atmospheric pressure and liquid solution phase conditions.

Figure 2B:
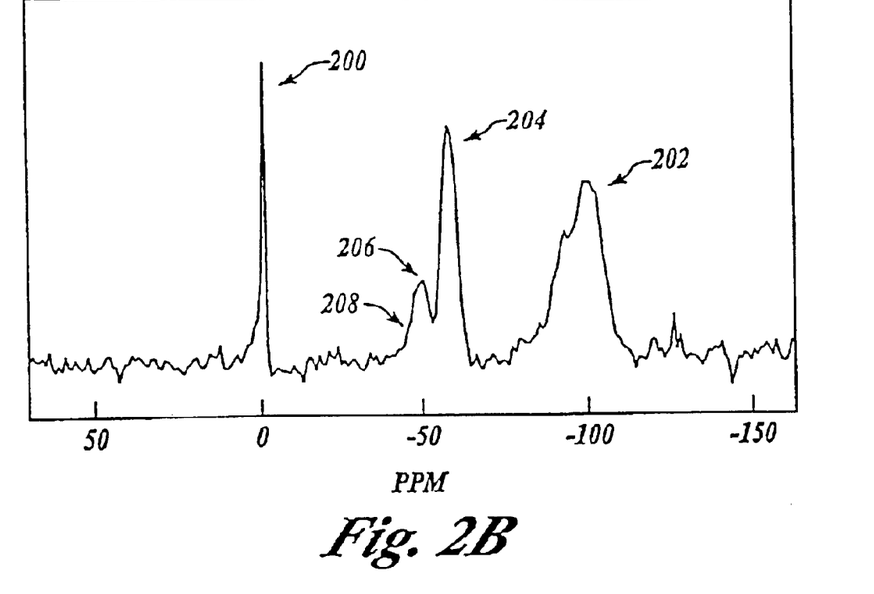
FIG. 2b is an NMR spectrum of a 24-hour sample made according to the present invention.
Figure 2C:
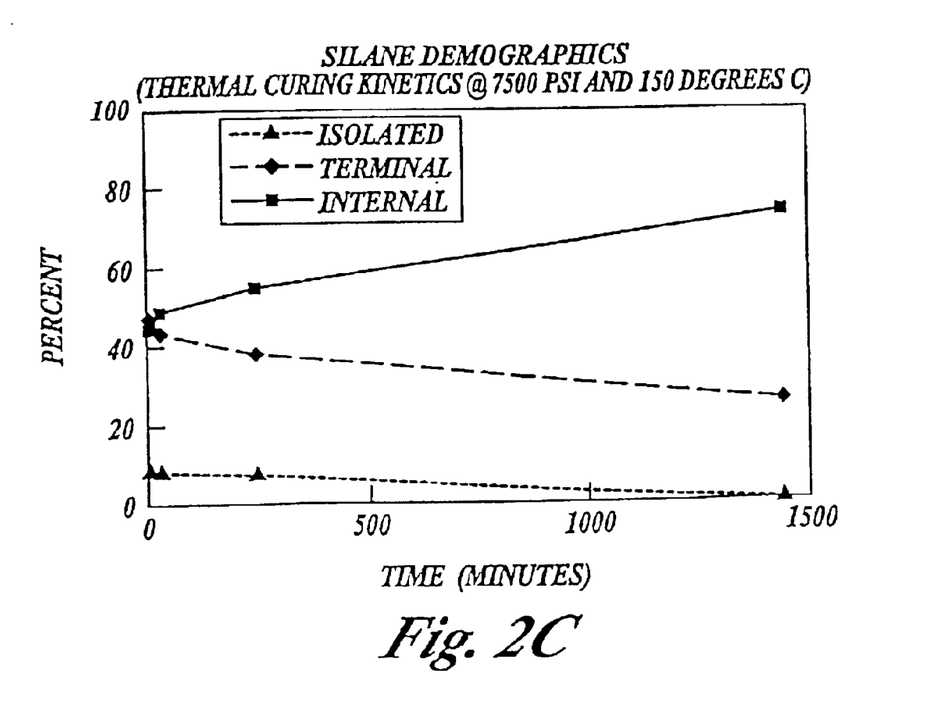
FIG. 2c is a peak ratio (percent) versus time for various samples.

It was also found that maintaining the sample at elevated temperature and pressure in $SCCO_2$ resulted in a slow but steady evolution of the silane demographics, with a gradual decrease in the population of the terminal silane with a concomitant increase in the population of the internal silane over 24 hours. Over this same timeframe, the signal for the isolated silane completely disappeared, indicating an annealing of the "dangling" hydroxyls within the monolayer, resulting in a greater fully bonded fraction or higher degree of siloxane cross-linking. In this experiment, we observed a terminal to internal silane ratio (based upon total area under each peak) of approximately 1:4 after 24 hours (FIG. 2b). This is unexpectedly the highest degree of crosslinking in a silane based monolayer documented by $^{29}Si$ NMR. Ratios as a function of time are summarized in FIG. 2c showing evolution of silane demographics.

Both the surprising surface density and the unexpected high degree of crosslinking are directly attributable to the use of $SCCO_2$ as the reaction medium.

EXAMPLE 3

An experiment was conducted as in Example 2 wherein a portion of the material from the 5-minute sample was re-exposed or re-introduced to the supercritical fluid environment for an additional 30 minutes.

Figure 3:
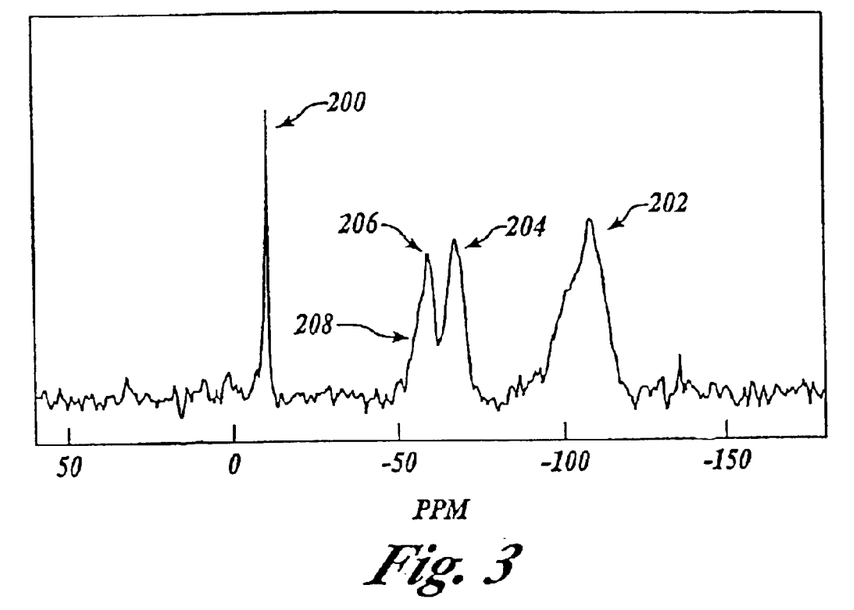
FIG. 3 is an NMR spectrum of a 5-minute sample re-annealed for 30 minutes.

Results are shown in FIG. 3. The evolution or formation of the monolayer continued in the same manner as for continuous supercritical fluid exposure.

EXAMPLE 4

An experiment was conducted to demonstrate the enhanced chemical stability of the coating material as produced as in Example 2. Samples of the coating material of the present invention from Example 2 were exposed to a series of identical buffer solutions of various pH. Comparative samples of solution deposited coating material were exposed to identical buffer solutions of various pH from pH 0.5 to pH 12.5.

Figure 4:
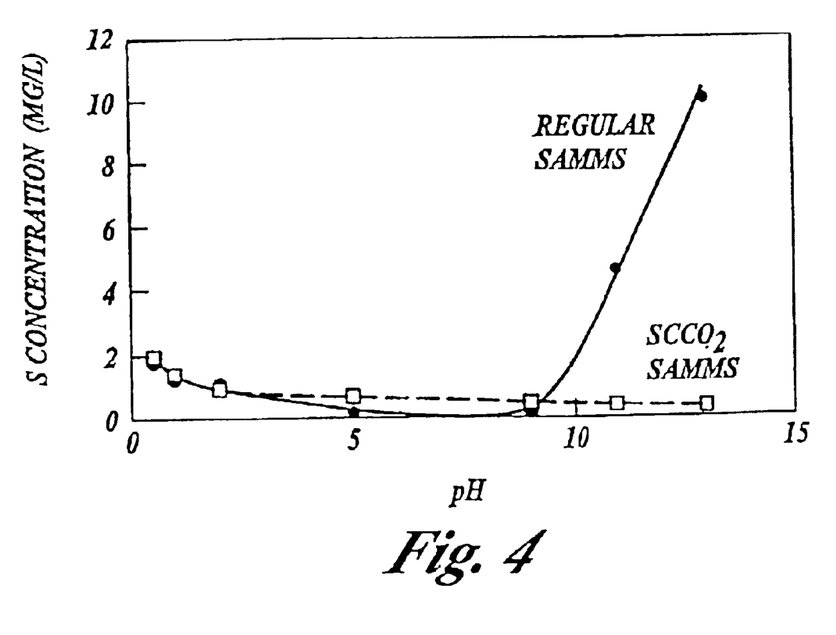
FIG. 4 is a graph of sulfur concentration versus pH for samples made according to the present invention and compared to samples made by solution deposition exposed to corrosive solutions.

Results are shown in FIG. 4 wherein essentially no difference is observed for pH less than 9, but above pH 9 up to pH 12.5, the solution deposited material (Regular SAMMS) exhibits a leaching or loss of sulfur to the solution indicating a degradation of the monolayer. The supercritical deposited material according to the present invention shows no change in sulfur concentration above pH 9 up to pH 12.5.

This increase in chemical durability of the monolayer is an unexpected result.

EXAMPLE 5

An experiment was conducted as in Example 2 wherein Zeolite beta from (Zeolyst) in the form of beads (3 mm in diameter) was mixed with tris(methoxy) mercaptopropylsilane (TMMPS) with a zeolite to TMMPS weight ratio of 0.67 and loaded into the sample container in the supercritical reaction vessel. The system was sealed. The pressure and the temperature were increased to 7500 psi and 150° C. using $CO_2$. The zeolite was treated under these conditions for 12 hours before the pressure was reduced and temperature decreased to 25° C. The treated zeolite beads were recovered after the treatment, and ground into powders for further treatment.

Functionalized and unfunctionalized zeolites were characterized by X-ray diffraction (XRD). The XRD peaks recorded are consistent with the XRD data reported for zeolite beta, but the diffraction peaks are broader and weaker. Apart from the two main peaks at 2 theta of 7.7° and 22.5°, other minor diffraction peaks are not well resolved. The XRD data suggest that the commercial zeolite beta used here has a similar crystalline structure as the synthetic high purity zeolite beta, but has smaller crystallite size, or a higher degree of disordering. Transmission electron microscopy (TEM) images and electron energy dispersive X-ray spectroscopy (EDX) spectra were also obtained. Because the commercial zeolite beta is not highly crystalline, the zeolite lattice fringes are not resolved in the TEM image. In the EDX spectrum, a strong Si peak, a small Al peak (from the zeolite material), and a small S peak is observed. This S peak comes from the sulfonate group introduced into the zeolites during $SCCO_2$ functionalization. From the EDX data the sulfonate group density in zeolite can be estimated to be 0.87 mmol sulfonate/g zeolite. The aluminum concentration is about 2% by weight.

Typically part of the unreacted silanes and by-products would be forced out of the inner volume of the porous substrate when the pressure was quickly reduced in the supercritical treatment. After the supercritical treatment, the materials were further treated with $H_2O_2$/method solutions and $H_2SO_4$ solutions over long periods of time during the acidifying and sulfonation procedure, which also includes many washing and rinsing steps involving ethanol and water. It is expected that any physically trapped silanes or its by-products should be removed from the material during these treatments. This conclusion is verified by acid washing experiments. No silane product was released, as measured by NMR experiment, when the sulfonated zeolite was subject to extended wash in 0.1 M acid solutions.

A Chemagnetics NMR spectrometer was used to obtain $^{29}Si$ NMR results. It is important to recognize that relative peak intensities in $^{29}Si$ CP-MAS are not strictly quantifiable due to differences in relaxation behavior. Therefore, we have used the Bloch decay pulse sequence (single pulse excitation) with long recycle times (30 sec) to obtain the spectrum more representative of the molecular composition of these materials. The large peak at −110 ppm is from the silica support. The broad feature at −110 ppm is also indicative of the poor crystalline nature of the zeolite. Two additional peaks from −50 to −80 ppm corresponding to siloxane groups in the functionalized zeolites are observed. The siloxanes peaks are much more pronounced than reported in literature, suggesting a higher surface coverage. The peak positions suggest a high degree of crosslinking between the siloxane groups, and between siloxane groups and the substrate. Since the small pore size excludes the possibility of close packing of the silane groups, so most likely the siloxanes are attached to the substrate with a tridentate, or bidentate binding. On smooth, substrates or in large pore materials, both tridentate and bidentate bindings are not favored. This binding scheme has been reported in zeolites because of the small pore size and high curvature.

The conversion of HEX and PYC can be easily quantified and the only observed products were the mixtures of reactants and acetalized (or ketalized) products. For sulfonated zeolite (Z-$SO_3$H), more than 60% HEX was converted in 4 hours, and nearly complete conversion was observed over 12 hours. On the other hand, PYC, which has a large molecular size and cannot enter the microporosity, showed less than 8% conversion over extended reaction time with same Z-$SO_3$H as catalyst. These results indicate that the Z-$SO_3$H material is size selective, and that the majority of $SO_3$H groups are inside the microporosity and are accessible to molecules smaller than the pore size, and inaccessible to the molecules larger than the pore size. The reaction rate with $SCCO_2$ Z-$SO_3$H compares favorably with similar zeolite functionalized using an in-situ deposition technique, which produced 38% conversion of HEX in 4 hours under the same conditions. Both HEX and PYC were also reacted over pure zeolite beta (Z), and the TMMPS functionalized zeolite (Z-SH) before it was treated with $H_2O_2$. Pure zeolite and Z-SH showed low catalytic activity, and only a small fraction of either HEX and PYC was converted. It can be concluded from these results that the majority of $SO_3$H groups reside inside the zeolite pore channels and act as the active center for the reaction. It is important to note that no additional extraction procedure was performed on the supercritically processed zeolite to remove chemically bonded sulfonated groups on the external surface of the zeolite. Therefore a small portion of chemically bonded sulfonated groups remained on the external surface, which gave rise to the residual activity observed for PYC. However, the contribution of the external sulfonic groups to the overall reaction is minimal. Furthermore, the activity of the external acid groups can be selectively neutralized to achieve complete size selectivity (which has been demonstrated in our experiments). The external acid groups can be also removed through a post extraction treatment.

The high activity of the functionalized zeolite over the parent material is attributed to the acidic groups introduced by the functional groups. To verify this, acid-base titration was conducted to determine the number of acid sites. The titration was conducted in 5.0 ml 0.1 N HCl solution with 0.05 g suspended solid powders using a 0.1 N NaOH solution as the titrant. The titration curve is the superposition of the titration curve of the strong acid (HCl) and that of the surface acid group from the catalyst. The proton capacity (acid site density) can be calculated using standard methods. The titration experiments showed that the sulfonated zeolites (Z-$SO_3$H) have a much high proton capacity (25.7 mmol/g) as compare with the native zeolite beta (3.79 mmol/g) and the unsulfonated thiol zeolite (Z-SH) (3.37 mmol/g).

For comparison, sulfonated mesoporous silica (M-$SO_3$H) was used to catalyze the conversion of PYC and HEX. In this case both HEX and PYC can easily enter the pore channel and access the catalytic $SO_3$H sites. Therefore low-selective conversion of both HEX and PYC were observed.

Further evidence of the size selectivity is provided when amines of different sizes are used to poison (neutralize) the acid sites. Reaction of HEX and glycol was performed over Z-$SO_3$H as discussed before. Triethylamine (($C_2H_5$)$_3$N, or TEA) is added to the reaction bath after 40 minutes. TEA is a small molecule and can enter the microporosity and poison all the acid sites. The addition of TEA completely stopped the reaction. Under the same condition the addition of methyldioctylamine [($CH_3(CH_2)_7$)$_2$N$CH_3$, or MDOA] instead of TEA did not have any effect on the conversion of HEX over Z-$SO_3$H, because the molecular size of MDOA is too large for it to enter the microporosity and poison the acid sites in the internal pore channels. The addition of MDOA did effectively neutralize all the residual acid sites on the external surfaces of Z-$SO_3$H. Zero activity was observed for PYC under these conditions. If the pore size is large enough, like in mesoporous silica (M-$SO_3$H), MDOA is an effective poison for acid catalyzed reaction. We have shown that the addition of MDOA to the reaction bath of HEX over M-$SO_3$H completely stopped the reaction in the mesoporous materials.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of functionalizing a porous material comprising the steps of
   a) hydrating a porous substrate;
   b) placing said hydrated porous substrate into a vessel in the presence of a precursor comprising assembly atoms and cross linking atoms;
   c) sealing the vessel;
   d) introducing a supercritical fluid into said vessel for a time while increasing the pressure and temperature within said vessel to a supercritical pressure and temperature;
   e) maintaining the porous substrate within said vessel under supercritical conditions for a time sufficient to fully cross link at least 70% of said assembly atoms with said cross linking atoms on the exposed surface of said materials.

2. The method of claim 1, whereby said porous substrate is ceramic.

3. The method of claim 2, whereby said ceramic porous substrate comprises pores having a diameter greater than 5 Å.

4. The method of claim 1, whereby hydrating said porous substrate is provided by a humidity chamber having a humidity 100%.

5. The method of claim 1, whereby said assembly atom is silicon.

6. The method of claim 1, whereby said supercritical fluid is carbon dioxide ($CO_2$), ethane ($C_2H_6$), ammonia ($NH_3$), and combinations thereof.

* * * * *

UNITED STATES PATENT AND TRADEMARK OFFICE
CERTIFICATE OF CORRECTION

| | |
|---|---|
| PATENT NO. | : 6,733,835 B2 |
| APPLICATION NO. | : 10/347040 |
| DATED | : May 11, 2004 |
| INVENTOR(S) | : Glen E. Fryxell et al. |

It is certified that error appears in the above-identified patent and that said Letters Patent is hereby corrected as shown below:

Col. 2, Line 33
Replace "intoto"
With --into--.

Col. 4, Line 65
Replace "the-plurality"
With --the plurality--.

Col. 5, Line 50
Replace "≦"

With --$\leq$--.

Col. 6, Line 11
Replace "silion"
With --silicon--.

Col. 7, Line 1
Replace "The silica"
With --the silica--.

Col. 9, Line 57
Replace "compare"
With --compared--.

UNITED STATES PATENT AND TRADEMARK OFFICE
CERTIFICATE OF CORRECTION

PATENT NO. : 6,733,835 B2
APPLICATION NO. : 10/347040
DATED : May 11, 2004
INVENTOR(S) : Glen E. Fryxell et al.

It is certified that error appears in the above-identified patent and that said Letters Patent is hereby corrected as shown below:

Col. 10, Line 58, Claim 4
Insert --of-- after "humidity".

Signed and Sealed this

Eighth Day of July, 2008

JON W. DUDAS
*Director of the United States Patent and Trademark Office*